Patented Nov. 1, 1932

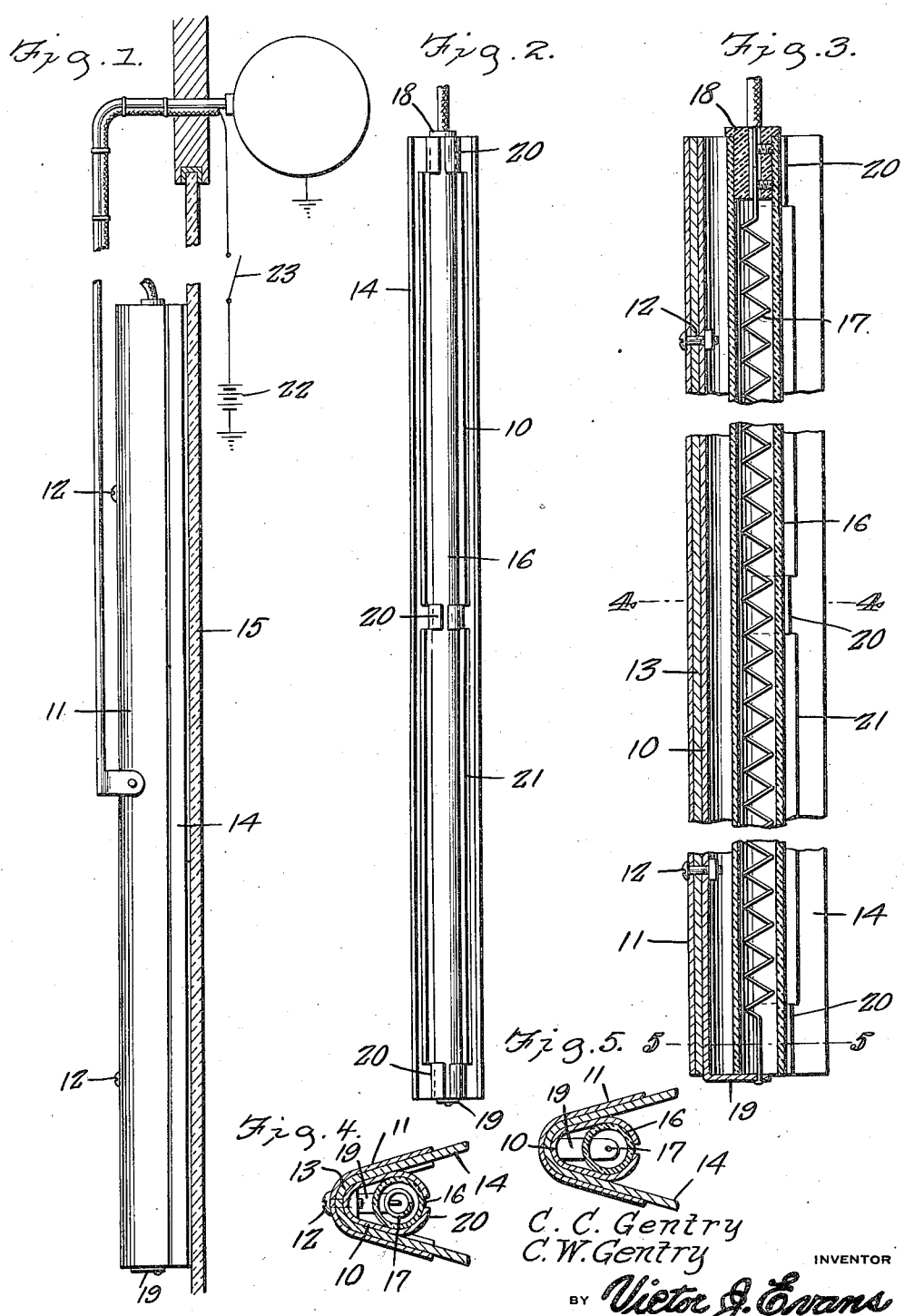

1,885,710

UNITED STATES PATENT OFFICE

CHALMUS CHARLES GENTRY, OF BLUEFIELD, WEST VIRGINIA, AND CARLYLE W. GENTRY, OF POCAHONTAS, VIRGINIA

WINDSHIELD WIPER

Application filed October 10, 1930. Serial No. 487,844.

This invention relates to windshield wipers of the electrically heated type, an object being to provide a wiper of novel construction having spaced wiping elements to effectually wipe a windshield.

Another object of the invention is the provision of an electrically heated windshield wiper in which the wiper holder is utilized both to carry and back up the flexible wiper element, and in addition, accommodate and grip a holder in which is housed an electric heating element.

With the above and other objects in view, the invention further includes the following novel features and details of construction to be hereinafter more fully described, illustrated in the accompanying drawing and pointed out in the appended claim.

In the drawing:

Fig. 1 is a fragmentary sectional view taken through a portion of a windshield with the invention applied.

Fig. 2 is an inner edge view of the wiper per se.

Fig. 3 is a central longitudinal sectional view with parts broken away.

Figs. 4 and 5 are sections taken respectively on the lines 4—4 and 5—5 of Fig. 3.

Referring in detail to the drawing wherein like characters of reference denote corresponding parts, the wiper as shown comprises a holder which is formed of inner and outer transversely U shaped metallic members 10 and 11 respectively. These members have clamped between them through the medium of bolts 12, a flexible wiper element 13. This wiper element is preferably made of rubber and has its longitudinal edges extending beyond the longitudinal edges of the holder as indicated at 14. Spaced wiping edges are thus provided for contact with the windshield 15, so that the latter will be thoroughly and effectually wiped. Located within the inner U shaped member 10 is a tube 16. This tube is formed of suitable insulating material and provides an insulating housing for a resistance coil 17 which extends through an insulated plug 18 at one end of the tube. One of the members 10 or 11 (preferably the former) has extending from its lower end an arm 19. This arm extends beneath the lower end of the tube 16 and has secured thereto the lower end of the resistance coil 17. The arm 19 thus assists in supporting the tube and provides a terminal for the resistance element.

The U shaped members 10 and 11 are formed of metal and the inner member 10 is provided with spaced clamping lugs 20 which engage around the tube 16 to hold the latter in place. The portion of the member 10 between these lugs 20 form backing wings 21 for the wiper element 13. The member 10 thus provides a portion of the wiper element holder, provides a backing for said element when the wiper is in operation, and in addition, provides means to clamp the tubular member 16 in place.

The resistance coil 17 may be connected in circuit with a source of current 22 and a switch 23 for controlling the current.

This invention is susceptible of various changes in its form, proportions and minor details of construction, and the right is herein reserved to make such changes as properly fall within the scope of the appended claim.

Having described the invention what is claimed is:

A windshield wiper comprising elongated inner and outer metallic plates bent into substantially U-shape in cross section, a flexible wiping strip secured between said plates and having the longitudinal edges thereof projecting beyond the longitudinal edges of the plates, an insulating tube arranged within the inner plate and extending the full length thereof, an electrical heating coil in said tube, an insulated block mounted in one end of the tube and supporting one end of the coil, an arm formed on the inner plate and engaging the other end of the tube and having the other end of the coil secured thereto, and tongues struck out from the inner plate and bent into engagement with the tube leaving the major portion of the inner plate to cooperate with the outer plate to provide backings for the flexible wiping strip.

CHALMUS CHARLES GENTRY.
CARLYLE W. GENTRY.